(12) United States Patent
Hauck et al.

(10) Patent No.: US 6,615,729 B2
(45) Date of Patent: Sep. 9, 2003

(54) METHOD AND DEVICE FOR DETERMINING AND/OR CONVERTING COLOR PROFILES

(75) Inventors: Axel Hauck, Karlsruhe (DE); Martin Mayer, Ladenburg (DE); Nikolaus Pfeiffer, Dover, NH (US); Manfred Schneider, Bad Rappenau (DE); Helmut Siegeritz, Kronshagen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/992,520

(22) Filed: Nov. 14, 2001

(65) Prior Publication Data

US 2002/0083859 A1 Jul. 4, 2002

(30) Foreign Application Priority Data

Nov. 17, 2000 (DE) .......................... 100 57 048

(51) Int. Cl.$^7$ ................................. G03F 3/08
(52) U.S. Cl. ................. 101/484; 101/211; 358/518; 358/523; 358/1.9; 358/2.1; 345/604; 382/167
(58) Field of Search .................. 101/484, 492, 101/211; 358/518, 523, 1.9, 1.15; 345/604; 382/167

(56) References Cited

U.S. PATENT DOCUMENTS

| | | | |
|---|---|---|---|
| 5,483,360 A | | 1/1996 | Rolleston et al. ............ 358/518 |
| 5,489,998 A | | 2/1996 | Yamada et al. .............. 358/523 |
| 5,662,044 A | | 9/1997 | Loeffler et al. .............. 101/492 |
| 5,884,014 A | * | 3/1999 | Huttenlocher et al. ...... 358/1.15 |
| 5,926,559 A | * | 7/1999 | Ohta ........................... 358/523 |
| 6,043,909 A | * | 3/2000 | Holub ......................... 358/518 |
| 6,072,901 A | * | 6/2000 | Balonon-Rosen et al. .. 382/167 |
| 6,075,888 A | * | 6/2000 | Schwartz ..................... 382/167 |
| 6,108,442 A | * | 8/2000 | Edge et al. .................. 382/167 |
| 6,307,961 B1 | * | 10/2001 | Balonon-Rosen et al. .. 358/518 |
| 6,430,311 B1 | * | 8/2002 | Kumada ...................... 382/167 |
| 6,462,748 B1 | * | 10/2002 | Fushiki et al. ............... 345/604 |
| 6,480,299 B1 | * | 11/2002 | Drakopoulos et al. ....... 358/1.9 |
| 6,522,427 B1 | * | 2/2003 | Bhattacharjy et al. ....... 358/1.9 |

FOREIGN PATENT DOCUMENTS

| | | |
|---|---|---|
| DE | 4305693 | 10/1993 |
| DE | 4334712 | 4/1995 |
| DE | 19506425 | 8/1996 |
| DE | 4335143 | 11/1998 |
| DE | 19844495 | 4/2000 |

* cited by examiner

Primary Examiner—Eugene H. Eickholt
(74) Attorney, Agent, or Firm—Davidson, Davidson & Kappel, LLC

(57) ABSTRACT

A method is proposed for generating a color profile using the determination of a mapping A' of a device-independent process space $Q^{(m)}$ of dimension m, m being a natural number, to a device-dependent process space $K'^{(n)}$ of dimension n, n being a natural number, for a first set of specific parameters, which is distinguished by the mapping being represented by a concatenation of mappings, which includes a known mapping A from $Q^{(m)}$ to a device-dependent process space $K^{(n)}$ of dimension n, n being a natural number, for another set of specific process parameters, which differs at least in one element from a first set of specific process parameters; and either of a mapping $T_K$ from $K^{(n)}$ to $K'^{(n)}$ or a self-mapping $T_Q$ by $Q^{(m)}$.

19 Claims, 5 Drawing Sheets

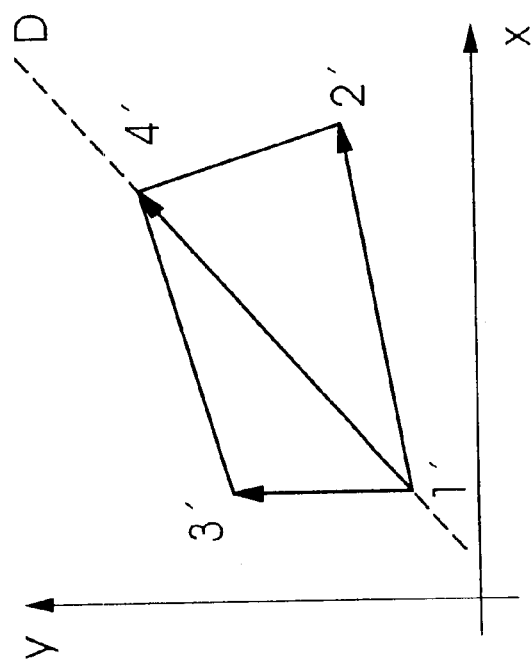
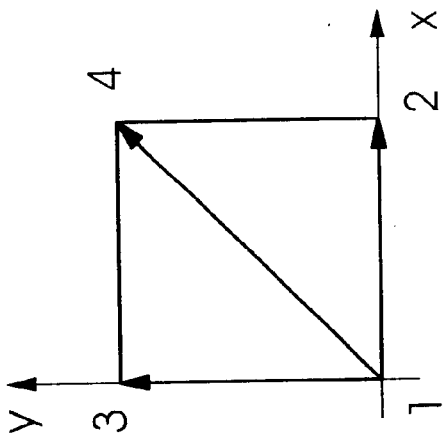
Fig.3

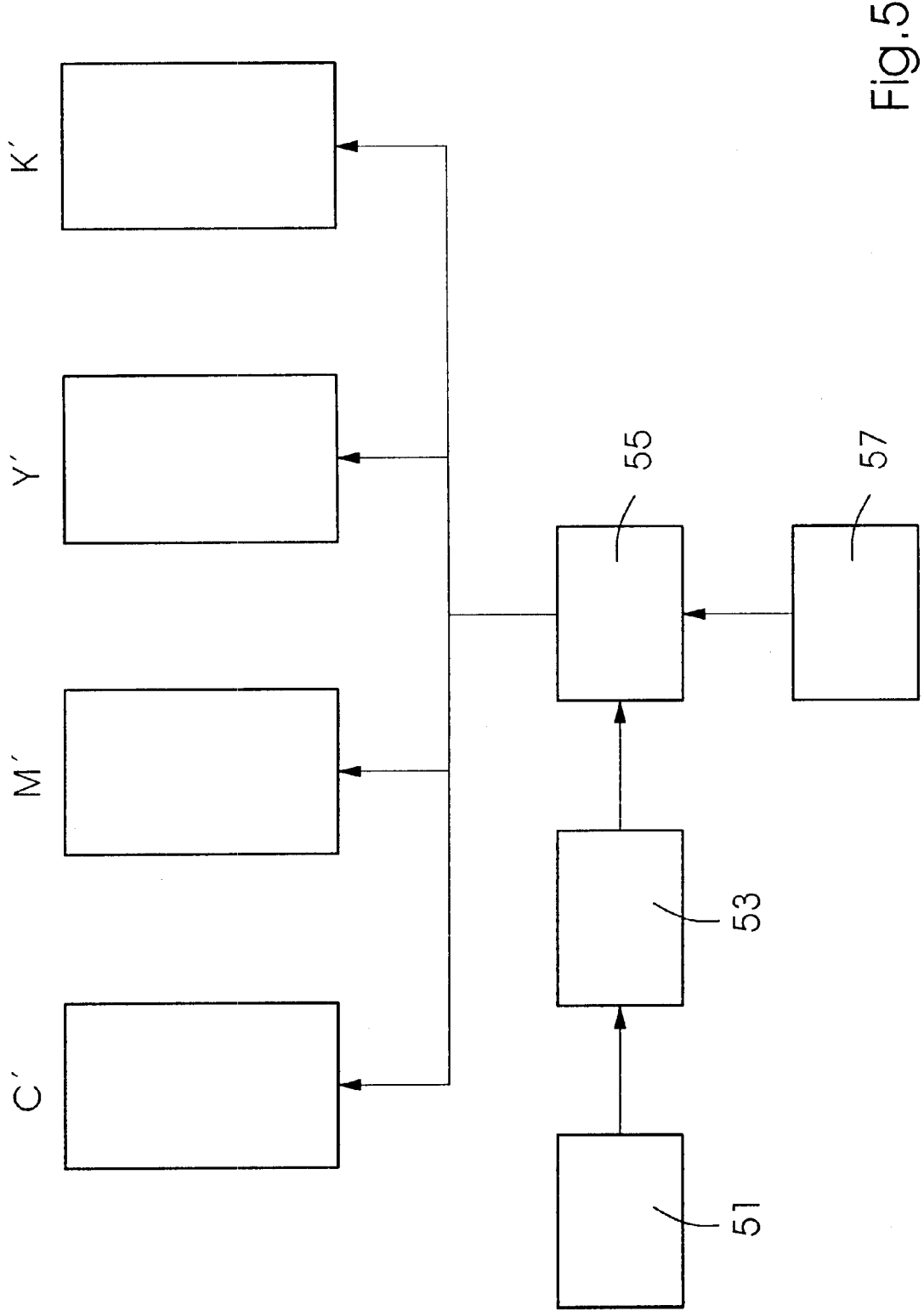

METHOD AND DEVICE FOR DETERMINING AND/OR CONVERTING COLOR PROFILES

The present application claims priority from German Patent Application No. 100 57 048.8, filed Nov. 17, 2000, and hereby incorporated by reference herein.

BACKGROUND OF THE INVENTION

The present invention is directed to a method and a device for generating a color profile using the determination of the mapping A' of a device-independent process space $Q^{(m)}$ of dimension m, m being a natural number, to a device-dependent process space $K'^{(n)}$ of dimension n, n being a natural number.

Tables constitute an essential part of color profiles. They enable device-independent color values, such as {Lab} or {XYZ} values, to be converted into device-dependent color values, such as CMYK, and vice versa, for various color reproduction strategies. The tables contain sampled values of multi-dimensional mappings, such as {CMYK} as a function of {Lab} or vice versa, in each instance for a regularly spaced grid of points in the particular input space. Functional values of points, which do not lie on the interpolation grid, are typically determined by employing diverse, suitable interpolation methods among the adjacent interpolation points. Generally, the color profiles are calculated with the aid of proof-printed test formes containing many different color fields, typically between 200 and 1000 individual colors. These test colors are gauged colorimetrically. They represent a sampling of the printing process. The mappings described in the tables of the profiles are, for the most part, very complicated, and generally are not able to be globally described in a closed form by mathematical formulas. Typically, the device-independent process space $Q^{(m)}$ is not linear, but metric. However, it may be represented accurately enough locally as a linear space. The device-dependent space $K^{(n)}$ is metric and is linear for important applications.

Often, printing processes for which profiles are created, are not constant, but change their properties over time, whether it be continuously or discontinuously. Thus, a previously generated profile may still be valid for the process, but only with limited accuracy, or it may no longer be valid at all. Often the influencing quantities, which lead to such changes, are not precisely known, neither with respect to their number nor their values. Possible influencing quantities include, inter alia: changes in paper, printing inks, and screen resolution; use of printing additives (thinners, printing jelly or the like), other surface processing (lacquer coat, powder, or the like), altered ambient conditions, such as temperature, air humidity, altered printing sequence or chromatic and achromatic composition.

The profiling of a printing press using a printing test entails considerable effort, time expenditure, as well as certain costs. Such a profiling must be specifically tailored to a parameter set of various conditions. Altering one parameter in the parameter set usually means that a completely new test is necessary. This is particularly true when a plurality of colors or papers is used in a printing company for one production lot. In other words, to avoid the deviations that a profiled edition is subject to when changing over from a previous to a specific, new parameter set, it is necessary to profile the printing press for the specific parameter set of the subsequent printing conditions.

A method and a device for generating a color profile is known, for example, from the German Patent Application No. 43 35 143 A1. This document describes a method and a device for converting color values of a first color space, typically {Lab}, into color values of a printing color space characteristic of equipment and systems in a printing process for the color image processing, typically {CMYK}. In order to adapt the color separation values to the particular printing process, for the color values {Lab}, the color separation values {CMYK}, assigned according to function, are analytically calculated, by approximation, as a printing table, taking into consideration the printing colors, the colormetric properties of the printing material and of the printing process parameters, and subsequently calculated using a color value calibration {Lab}->{L'a'b'}, in that correction values are determined by comparing characteristic color values in a test table to colormetrically measured color values of one of the test tables prepared as a print proof or proof.

Further related art is constituted by German Patent DE 43 05 693 C2. This publication describes a color calibration method where color values of a first color space which are dependent upon an input unit are converted into the color values of a second color space, and where, inter alia, to obtain color values of the first color space, a test sample containing a number of defined test colors is measured out. The color separation values of the first color space are converted into the color values of the second color space, which are assigned according to function, on the basis of a table. To acquire differential color values, from which appropriate color correction values are calculated, the color values of the second color space obtained by calculation are compared to the color values of the second color space obtained by measuring out the corresponding test colors.

German Patent Application No. 198 44 495A1 describes a method for profiling and calibrating a digitally controllable printing press having a permanent printing form, where a color profile is automatically selected from a local or non-local pool of color profiles, e.g. one that is accessible over the Internet, including in some instances, one-dimensional correction. To prepare definitive data, a data-processing device automatically employs a profile that corresponds exactly to the active state of the machine; in other words, a color profile corresponding to the correct color space calculation or calibration. To this end, a machine state predicted for the instant of printing and, with knowledge of the operating materials, a machine profile that most closely proximates the printing job, are determined at the instant of data preparation.

SUMMARY OF THE INVENTION

An object of the present invention is to provide a method for generating a color profile that entails less outlay.

The present invention provides a method for generating a color profile using the determination of a mapping A' of a device-independent process space $Q^{(m)}$ of dimension m, m being a natural number, to a device-dependent process space $K'^{(n)}$ of dimension n, n being a natural number, for a first set of specific process parameters. The mapping A' is represented by a concatenation of known mapping A from $Q^{(m)}$ to a device-dependent process space $K^{(n)}$ of dimension n, n being a natural number, for another set of specific process parameters, which differs, at least in one element, from a first set of specific process parameters; and either of a mapping $T_K$ from $K^{(n)}$ to $K'^{(n)}$, or of a self-mapping $T_Q$ by $Q^{(m)}$.

To produce a new color profile each time the properties, and thus the parameters, of a printing process change, it is not necessary to measure out all color fields again, when one can assume that, in response to typical variations, the entire characteristic of the printing process does not change, but rather only certain parameters exhibit, for the most part, slight changes. Instead of producing a new color profile in the same manner as the previous one, new measured values are determined for only a few test colors. The characteristic parameters of the variation are determined, using a given calculating rule, from the comparison to the old values, which may be derived from the old color profile, for example, directly or via a simple calculation. Using a variation model determined on the basis of these characteristic parameters, a new color profile, which better conforms to active process state, may then be calculated from the old color profile, thereby improving the printing quality. The present invention provides a method and a device which make it possible for a color profile to be generated rapidly and accurately. To this end, an approximative, analytical conversion of an old color profile having specific first process parameters to a new color profile is performed arithmetically for specific other process parameters, such as color, paper, resolution, or the like. In this manner, the benefit of a reduced outlay for profiling is achieved. Thus, by employing the method and/or the device of the present invention, the need for a complete printing test for the profiling may be eliminated, when it comes to changing the color scale, the printing material, the screen count, or corresponding process parameters, since only a small number of new measured values is required in a test. The method and/or the device of the present invention achieve simplification, shorten the time required, and reduce technical outlay, making the printing press or the pre-press unit easier to use and reducing the costs entailed in their application.

In accordance with the method of the present invention, from a known old color profile, a new color profile may be defined on the basis of the measurement of the color spectra and, respectively, of the {Lab} values of the printing material, as well as on the basis of the process colors for solid areas or flat tints; in an advantageous embodiment, also screen tints may be defined for the primary and/or secondary and/or tertiary colors. For this, the existing assignment rule is converted between values in the device-independent process space Q and the device-dependent process space K, the so-called look-up tables, with knowledge of the spectra of the new colors and/or the new printing material, and the spectra of the corresponding old colors and/or the printing material. The new colors may be a matter, for example, of a new four-color set, an altered screen count, or also, however, of a modified four-color set composition, or the sequence of printing the individual colors.

The present invention also provides a device for generating a color profile, using a mapping A' from an m-dimensional, device-independent process space $Q^{(m)}$ to an n-dimensional, device-dependent process space $K'^{(n)}$, n, m being from the natural numbers, wherein the device has an arithmetic unit or processor (55), which, from a known color profile, thus from a mapping A from a device-independent process space $Q^{(m)}$ to a device-dependent process space K, generates a new color profile, thus the mapping A', using a calculating rule, which describes a concatenation of mappings, which includes a mapping from $K^{(n)}$ to $K'^{(n)}$ and/or from $Q^{(m)}$ to $Q'^{(m)}$.

BRIEF DESCRIPTION OF THE DRAWINGS

Other advantages and beneficial further embodiments of the present invention are presented on the basis of the subsequent figures and descriptions thereof, in which:

FIG. 3 shows the possible effect of self-mapping $T_Q$ by device-independent process space $Q^{(m)}$ for a two-dimensional space selected by way of example;

FIG. 5 shows a schematic representation of the topology of the device according to the present invention for producing a color profile using an arithmetic unit to generate the necessary conversion of an old color profile into a new one.

DETAILED DESCRIPTION

Figure 1:
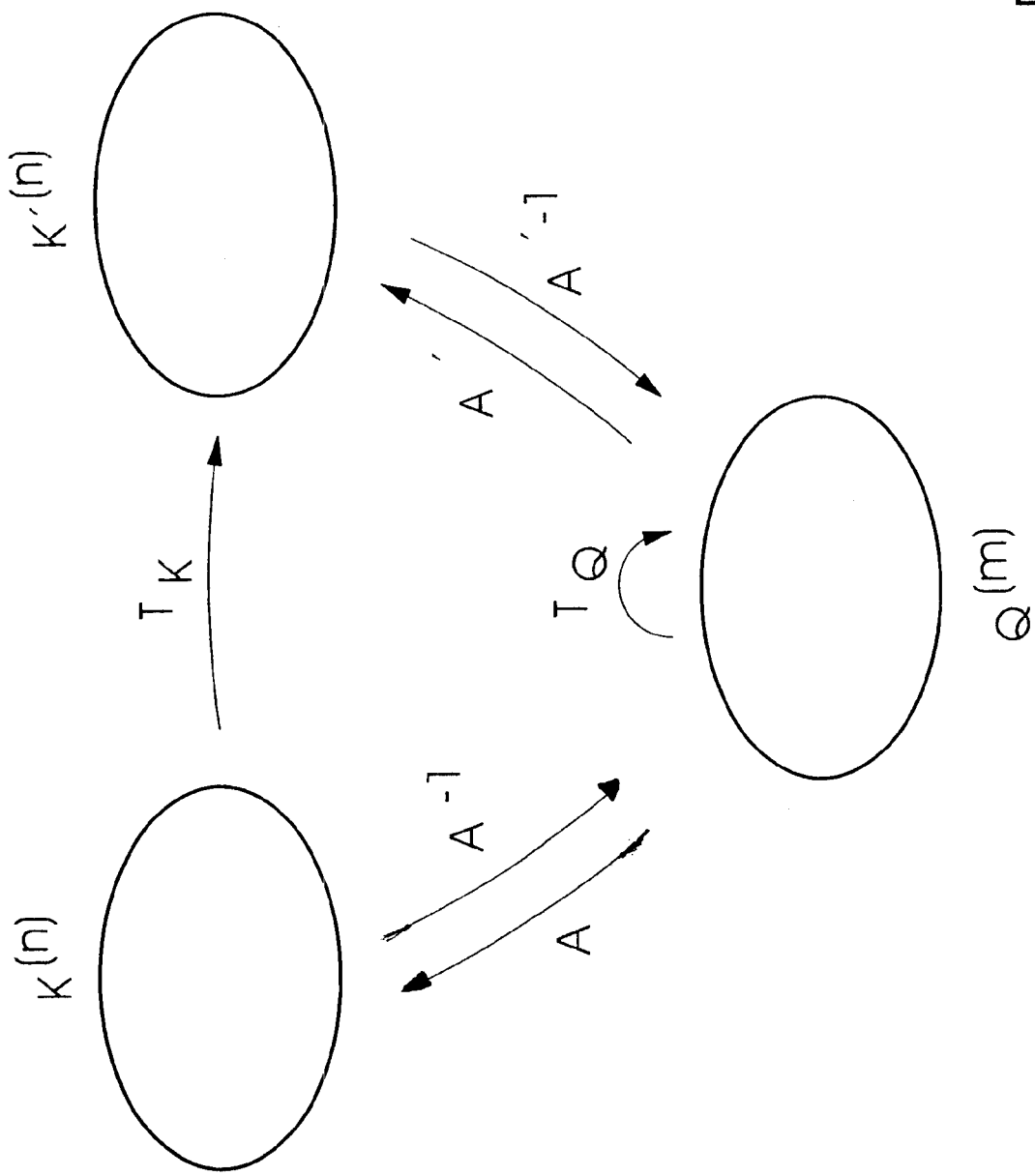
FIG. 1 shows a schematic diagram for depicting the process spaces, including the mappings between these.

FIG. 1 is a schematic diagram for illustrating the process spaces, including the mappings between these. The device-independent process space $Q^{(m)}$ is given, m being a natural number and denoting its dimensions. With no restriction to universality, this is a three-dimensional space by way of example, such as the {Lab} or {XYZ} space. However, it may also be a space of typical, measured spectra of a dimension greater than or equal to 32. Known is mapping A, in accordance with the color profile, to a device-dependent process space $K^{(n)}$, n being a natural number and denoting its dimensions. Typically, the device-dependent process space has 3, 4, 5 dimensions or more. It is a question, for example of a {CMY}, {CMYK}, or {CMYKS} space. Here, C denotes cyan, M magenta, Y yellow, K black and S a special color. Higher dimensional spaces having a plurality of special colors are also possible, however. To be defined is a mapping A' from device-independent process space $Q^{(m)}$ to a device-dependent process space $K'^{(n)}$. This new device-dependent process space $K'^{(n)}$ describes the printing using new process parameters. The method according to the present invention determines mapping A' by a concatenation of known mapping A from device-independent process space $Q^{(m)}$ to device-dependent process space $K^{(n)}$ for another set of specific process parameters, which differ, at least in one element, from the first set of specific process parameters, and either of a mapping $T_K$ from device-dependent process space $K^{(n)}$ to device-dependent process space $K'^{(n)}$, or of a self-mapping $T_Q$ by device-independent process space $Q^{(m)}$.

In one preferred specific embodiment of the present invention, mapping A is able to be locally represented for subsets from device-independent process space $Q^{(m)}$ to device-dependent process space $K^{(n)}$ as affine mapping. Therefore, from $Q^{(m)}$ to $K^{(n)}$, it exhibits an n×m matrix and an n-dimensional vector, while inverse mapping $A^{-1}$ exhibits an m×n-matrix and an m-dimensional vector. To convert an old color profile to a new one, mapping $T_K$ from device-dependent process space $K^{(n)}$ to device-dependent $K'^{(n)}$ is defined, so that a concatenation of known mapping A, utilizing the conversion or adaptation by mapping $T_K$, renders possible an approximative approach which is sufficiently accurate for mapping A' from device-independent process space $Q^{(m)}$ to device-dependent process space $K'^{(n)}$. $A'^{-1}$ denotes the inverse mapping. In one advantageous specific embodiment, mapping $T_K$ may be represented as an n×n matrix, if indicated including displacement or offset, so that a simple calculation of the linked mapping from A and $T_K$ is rendered possible in accordance with rules of linear algebra. For at least one altered color, altered density of the printed color, or for adaptation of the solid tints in response to a change in the printing material, device-independent values from the device-independent process space $Q^{(m)}$ are measured for chosen values from the device-dependent process space $K'^{(n)}$. In other words, mapping A' is measured out at single points. One advantageous specific embodiment concerns a set of points which includes the extreme points of the process, thus the solid tints. Through inverse calculation $A^{-1}$, values in device-independent process space $Q^{(m)}$ are known for corresponding points in device-dependent process space $K^{(n)}$. Provided that small process changes are concerned, mapping $T_Q$ is represented as a linear transformation. Typically then, it exhibits a small angular rotation of about 0 and an extension of about 1. From a measurement of m independent points of device-independent process space $Q^{(m)}$ of the new colors and from the knowledge of the m corresponding points in device-independent process space $Q^{(m)}$ of the old colors, one is able to calculate the m×m unknown entries of the m×m matrix and, if indicated, the displacement or shift vector, which represents linear transformation $T_Q$. For this purpose, a linear system of equations having m×m unknowns and, respectively in the case of additional displacement (m+1)×(m+1) unknowns is to be solved. Defining mapping A' as a concatenation of mappings A and $T_K$ requires calculating an n×n matrix, which represents mapping $T_K$. In the case of small changes, where the method of the present invention is applied, the basis of the device-dependent process spaces $K^{(n)}$ and $K'^{(n)}$ differ only slightly. It is, therefore, possible to define the m×m block of the n×n matrix, which acts on the subvector of the old color components, in accordance with the following rule: the m×m matrix for transformation $T_Q$ in the basis of the {Lab} values of the measured old colors essentially indicates those components which may be used to represent the new colors out of the old colors. The entries are, therefore, approximately equal to the entries in the block of transformation matrix $T_K$. To determine the further 2n-1 entries for each additional color, {Lab} values of the new additional color are associated in a linear formulation with the {Lab} values of the old additional color and with two of the colors selected from {CMY}. In other words, from m equations, a linear system of equations is to be solved for m variables. The additional colors are selected in such a way that the sum of the amounts of the components of the m-dimensional vector of the m variables becomes minimal. However, other optimization methods are also conceivable. In the case of small changes, the method of the present invention provides for the 2n-1 further entries of the n×n matrix, which represent transformation $T_K$, to be determined from the components of the m-dimensional vector in the basis of the {Lab} values of the old colors.

In another advantageous embodiment, the method of the present invention may be applied when the colors do not exist as printed colors. In beneficial fashion, missing color locations in the device-independent process space $Q^{(m)}$ may be calculated, by approximation, from spectra.

The method of the present invention likewise advantageously provides for allowing for a change in a printing material. For this one utilizes the fact that mapping A and inverse mapping $A^{-1}$ are able to be written locally as affine mapping. The m-dimensional vector assigned to this affine mapping describes the {Lab} values of the white content, in other words of the printing material, thus, for example, paper. Therefore, it is only necessary to measure the {Lab} values of the new printing material and to add locally, in the validity domain of the affine mapping, an m-dimensional correction vector from the difference in the {Lab} values. In other words, it is determined which color, in which content, is needed for printing the new printing material. By inverting the affine mapping rule, one obtains the n-dimensional vector for correcting the necessary color components in mapping A.

Figure 2:
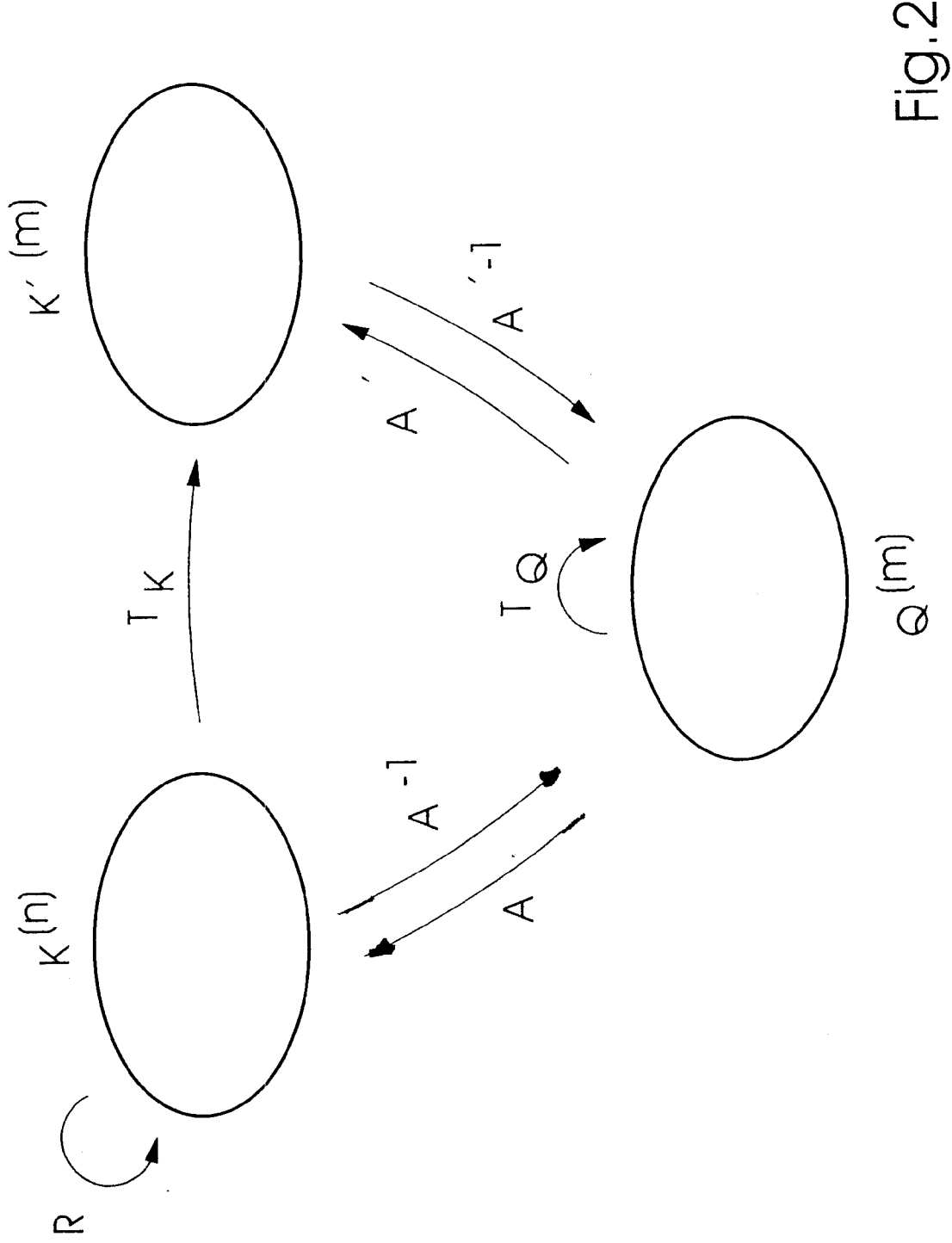
FIG. 2 shows mappings between the process spaces, including additional self-correction mapping R by device-dependent process space $K^{(n)}$.

FIG. 2 shows the various mappings A, A', as well as $A^{-1}$, $A'^{-1}$, $T_K$ and $T_Q$ between process spaces $K^{(n)}$, $K'^{(n)}$ and $Q^{(m)}$, including an additional self-correction mapping R by device-dependent process space $K^{(n)}$. In one advantageous embodiment of the present invention, the new mapping A' from device-independent process space $Q^{(m)}$ to device-dependent process space $K'^{(n)}$ is illustrated as a concatenation of mapping A, of correction mapping R, and of transformation $T_K$. From the existing functional values of mapping A of the old color profile, iteratively modified solid components of the basic colors may be calculated, for example, by applying the Neugebauer equation or other calculating rules. These modified solid components are then taken into consideration in determining new mapping A', thus the new color profile. The new color profile is calculated in accordance with the described method as a concatenation of mappings A, R and $T_K$, which had been generated from mapping $T_Q$.

FIG. 3 elucidates the possible effect of a self-mapping $T_Q$ by a device-independent process space $Q^{(m)}$, based on an example of a space where dimension m equals 2. The limitation to a two-dimensional space is selected solely for explanatory purposes. Under certain conditions, the action of mapping $T_Q$ may extend beyond a similarity transformation, i.e., constitute a distortion or colormetric shift. Equivalent mappings $T_Q$ also occur in higher dimensional spaces where m>2. Distortions are then distortions of hypercubes. FIG. 3 illustrates that a practical decomposition into triangles makes it possible to represent such transformations, by domains, as affine mapping. An analogous procedure is also possible for higher dimensional spaces. In the three-dimensional case, a tetrahedral decomposition of a hypercube is described, for example, in the German Patent Application No. 298 13 519 A1.

The left half of FIG. 3 shows a square having corner points 1, 2, 3, 4 for an exemplary two-dimensional space having spanning vectors x and y. A self-mapping $T_Q$ of the space results in the square 1', 2', 3', 4'. Two of the vectors 1,2 1,4 and 1,3, respectively, span the space, forming a base. To describe mapping $T_Q$ using affine transformations, it is necessary to decompose the square along a diagonal, here for example diagonal 1',4', denoted by D. The transformation of points 1, 4, 3 via mapping $T_Q$, into points 1', 3', 4', may then be described by an affine mapping; it is therefore, in particular, linear. Likewise, the mapping of points 1, 2, 4, with the assistance of $T_Q$, to 1', 2', 4', may be described by a further affine mapping. Along the diagonal, mapping $T_Q$ is continuous, but not necessarily differentiable.

One skilled in the art will quickly discern that the instance shown in FIG. 3 may be universalized quite easily to include a geometric body with p corners, p being a natural number, which is triangulated accordingly. For each triangular domain, an affine mapping may then be defined as a representation of $T_Q$. One skilled in the art will likewise easily discern that a universalization to higher dimensional spaces is also possible. In the three-dimensional case, for example, a hyper-polygon is decomposed into tetrahedrons. This applies correspondingly to higher dimensional spaces.

The geometric body with p corner triangulation method elucidated in FIG. 3 may be employed for establishing domains in which self-mapping $T_Q$ may be defined for the transformation of device-independent process space $Q^{(m)}$ as affine mapping, thus linear mapping, advantageously without displacement or offset. In this manner, it is possible to take more than m×m measured values for mapping A'. Besides full tones of the new colors, half-tone values or other intermediate values may also be measured out.

Figure 4:
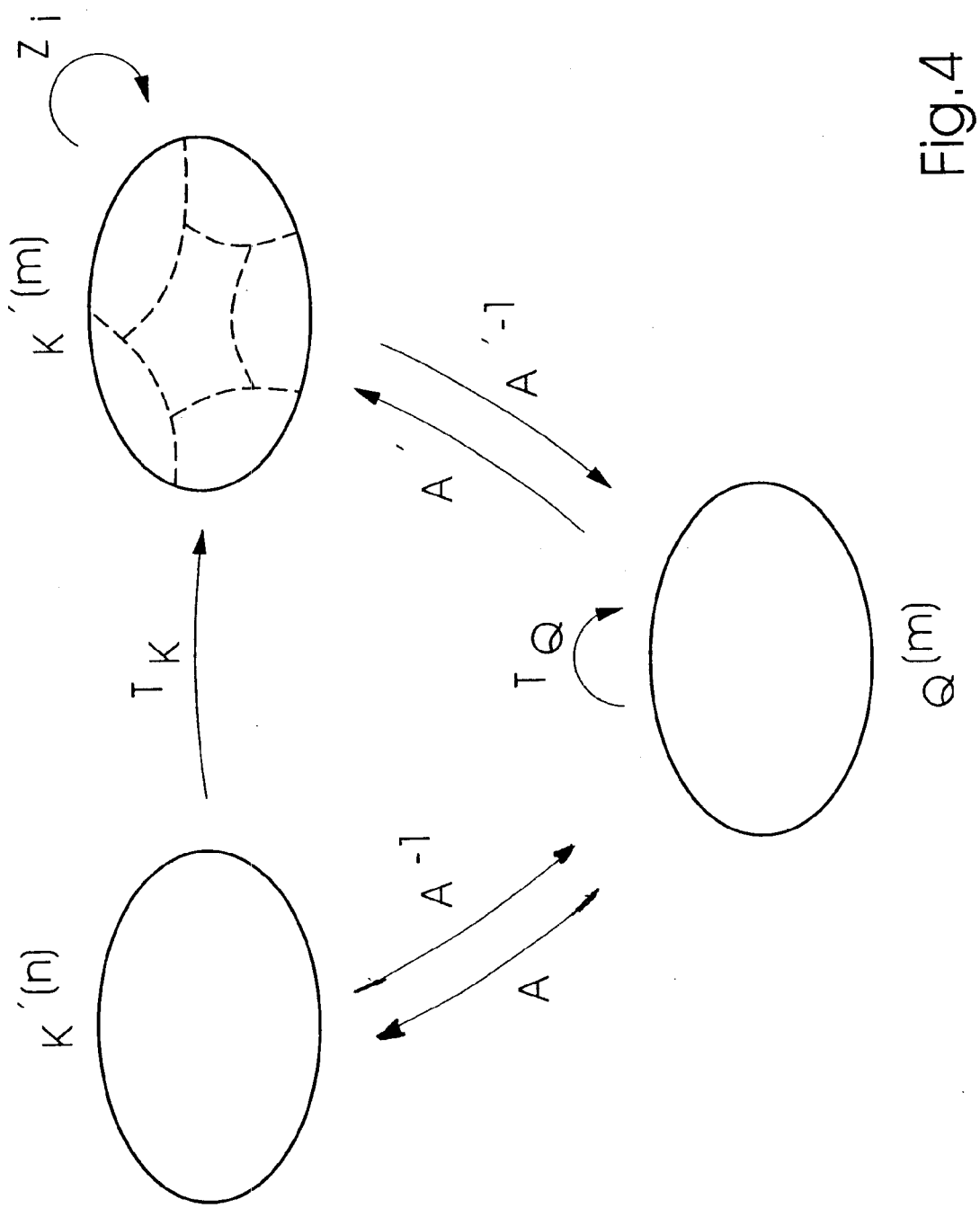
FIG. 4 shows mappings between the process spaces including additional decomposition $Z_i$, i being from the natural numbers, into i disjoint subsets of process space $K'^{(n)}$.

FIG. 4 is a schematic representation of the mappings between process spaces, as already shown in FIG. 1, including an additional mapping $Z_i$, i being a natural number. Additional mapping $Z_i$ decomposes device-dependent process space $K'^{(n)}$ into i disjoint subsets. Situated in each of these disjoint subsets are m points, for which the points reached under mapping $A'^{-1}$ are measured in device-independent process space $Q^{(m)}$. For each of these groups of m points in each disjoint subset, the method of the present invention provides for the transformation matrix and shift, which mapping $T_Q$ calculates from the corresponding m points of the old color profile, as clarified in greater detail in the description of FIG. 1. In equivalent fashion, a matrix which represents mapping $T_K$ from $K^{(n)}$ to $K'^{(n)}$, may be calculated in each case for the subdomains of the decomposition. Consequently, in accordance with the present invention, mapping A' from device-independent process space $Q^{(m)}$ to device-dependent process space $K'^{(n)}$ is defined as a concatenation of mapping A to device-dependent process space $K^{(n)}$ and mapping $T_K$. This advantageous embodiment of the present invention makes it possible to better approximate the newly calculated color profile from the known old one. At the same time, only a small number of measuring points is needed.

Schematically illustrated in FIG. 5 is the topology of a device, as is advantageously provided in a printing press or a pre-press unit, and which has an arithmetic unit or processor 55, which, from a known color profile, thus from a mapping A from a device-independent process space $Q^{(m)}$ to a device-dependent process space $K^{(n)}$, generates a new color profile, thus a mapping A' from device-independent process space $Q^{(m)}$ to device-dependent process space $K'^{(n)}$, using a calculating rule, which includes a self-mapping from $K^{(n)}$ to $K'^{(n)}$ and/or from $Q^{(m)}$. Depicted as a preferred specific embodiment is a device for four-color printing, thus a device-dependent process space having four dimensions, including the base C' cyan, M' magenta, Y' yellow and K' black. To one skilled in the art, it is apparent that this topology is also retained when other colors are added, in that only equivalent output devices are coordinated with the four output devices C', M', Y' and K' shown here. Using a measuring device 51, the {Lab} values of the old colors are determined, so that a color profile, thus a representation of mapping A from device-independent process space $Q^{(m)}$, here, from {Lab} space to device-dependent process space $K^{(n)}$, thus here the {CMYK} space, is stored in a memory unit 53. Arithmetic unit 55 is able to access this memory unit 53. Measuring device 57 makes measured values from mapping A' available to arithmetic unit 55, enabling it, in accordance with the method of the present invention, to generate a color profile using mapping A' from device-independent process space $Q^{(m)}$, thus from the {Lab} space, to device-dependent process space $K'^{(n)}$, thus the {CMYK} space. The appropriate components of cyan, magenta, yellow and black may be relayed by arithmetic unit 55 to output devices C', M', Y' and K'.

Reference Numeral List $K^{(n)}$ n-dimensional, device-dependent process space
$K'^{(n)}$ n-dimensional, device-dependent process space
$T_K$ mapping from $K^{(n)}$ to $K'^{(n)}$
$Q^{(m)}$ m-dimensional, device-dependent process space
A mapping from $Q^{(m)}$ to $K^{(n)}$
$A^{-1}$ inverse mapping of A
$T_Q$ self-mapping of $Q^{(m)}$
A' mapping from $Q^{(m)}$ to $K'^{(n)}$
$A'^{-1}$ inverse mapping of A'
R self-mapping of $K^{(n)}$
x first basis vector of a two-dimensional space
y second basis vector of a two-dimensional space
1, 2, 3, 4 point in the two-dimensional space
1', 2', 3', 4' points in the two-dimensional space
D diagonals
$Z_i$ self-mapping of $K'^{(n)}$
51 measuring device
53 memory unit
55 arithmetic unit
57 measuring device
C' output device cyan
M' output device magenta
Y' output device yellow
K' output device black

What is claimed is:

1. A method for generating a color profile as a function of a mapping A' of a device-independent process space $Q^{(m)}$ of dimension m, m being a natural number, to a device-dependent process space $K'^{(n)}$ of dimension n, n being a natural number, for a first set of specific process parameters, the method comprising:

determining the mapping A' by concatenation of a known mapping A from $Q^{(m)}$ to a device-dependent process space $K^{(n)}$ of dimension n for a second set of specific process parameters and one of a mapping $T_K$ from $K^{(n)}$ to $K'^{(n)}$ and of a self-mapping $T_Q$ by $Q^{(m)}$, the second set of specific process parameters differing from the first set of specific process parameters in at least in one element.

2. The method for generating a color profile, as recited by claim 1, wherein the device-dependent process space is a color space, the color space describing a device-dependent printing or a device-dependent reproduction in a pre-press system.

3. The method for generating a color profile, as recited by claim 1, wherein the device-independent process space $Q^{(m)}$ has three dimensions.

4. The method for generating a color profile, as recited by claim 1, wherein the device-independent process space $Q^{(m)}$ is a {Lab} or {XYZ} space.

5. The method for generating a color profile, as recited by claim 1, wherein the device-dependent process spaces $K^{(n)}$ and $K'^{(n)}$ have 3 dimensions or more.

6. The method for generating a color profile, as recited by claim 1, wherein the device-independent process spaces $K^{(n)}$ and $K'^{(n)}$ are {C, M, Y}, {C, M, Y, K} or {C, M, Y, K, S} spaces, where C denotes cyan, M magenta, Y yellow, K black and S a special color.

7. The method for generating a color profile, as recited by claim 1, wherein the mapping $T_K$ or the mapping $T_Q$ is linear.

8. The method for generating a color profile, as recited by claim 1, wherein the mapping $T_K$ or the mapping $T_Q$ is represented by a linear transformation having an angle of rotation of about 0 and an extension of about 1.

9. The method for generating a color profile, as recited by claim 1 wherein the bases of the device-dependent process spaces $K^{(n)}$ and $K'^{(n)}$ differ only slightly.

10. The method for generating a color profile, as recited in claim 9, wherein the bases of the device-dependent process spaces K and K' differ by only one element from one another.

11. The method for generating a color profile, as recited by claim 1, wherein the mapping A from at least one subset of $Q^{(m)}$ is able to be described in at least one subset of $K^{(n)}$ as an affine mapping.

12. The method for generating a color profile, as recited by claim 12, wherein the displacement vector of the affine mapping A describes the printing material.

13. The method for generating a color profile, as recited by claim 1, further comprising carrying out an additional self-transformation R of device-dependent process space $K^{(n)}$.

14. The method for generating a color profile, as recited by claim 1, wherein the mapping A' is carried out in subdomains acquired by a decomposition $Z_i$, i being from the natural numbers, of the device-dependent process space $K'^{(n)}$.

15. The method for generating a color profile, as recited in claim 14, wherein m measurements are carried out for m, in a subdomain of the device-dependent process space $K'^{(n)}$, acquired by the decomposition $Z_i$, i being from the natural numbers, to determine m functional values of the mapping A'.

16. The method for generating a color profile, as recited by claim 14, wherein the mapping $T_Q$ in each domain acquired by the decomposition $Z_i$, i being from the natural numbers, is an affine mapping.

17. A device for generating a color profile, using a mapping A' from an m-dimensional, device-independent process space $Q^{(m)}$ to an n-dimensional, device-dependent process space $K'^{(n)}$, n, m being from the natural numbers, comprising:

a processor generating a new color profile from a predetermined color profile, the predetermined color profile being a function of a mapping A from a device-independent process space $Q^{(m)}$ to a device-dependent process space K, the new color profile being a function of mapping A', mapping A' being a concatenation of mappings, which includes at least of a mapping from $K^{(n)}$ to $K'^{(n)}$ and of a mapping from $Q^{(m)}$ to $Q'^{(m)}$.

18. A pre-press unit comprising a device in accordance with claim 17.

19. A printing press comprising at least one device in accordance with claim 17.

* * * * *